United States Patent [19]

Bertrand

[11] Patent Number: 4,666,656
[45] Date of Patent: May 19, 1987

[54] DEVICE FOR MEASURING TEMPERATURE

[75] Inventor: Pierre C. Bertrand, Igny, France

[73] Assignee: Sereg, S.A., Montrouge, France

[21] Appl. No.: 449,707

[22] Filed: Dec. 14, 1982

[30] Foreign Application Priority Data

Dec. 18, 1981 [FR] France .................. 81 23722

[51] Int. Cl.⁴ .................. G21C 17/00; G01K 7/20
[52] U.S. Cl. .................. 376/247; 374/185
[58] Field of Search ........ 376/247; 136/221, 230–232; 374/179, 183, 185, 208

[56] References Cited

U.S. PATENT DOCUMENTS

| | | | |
|---|---|---|---|
| 2,266,416 | 12/1941 | Duclos | 136/221 |
| 2,590,041 | 3/1952 | Roost | 374/165 |
| 2,762,998 | 9/1956 | Talbot | 374/185 |
| 2,818,482 | 12/1957 | Bennett | 374/185 |
| 3,281,518 | 10/1966 | Stroud et al. | 136/230 |
| 3,681,993 | 8/1972 | Cumpton et al. | 374/185 |
| 3,716,450 | 2/1973 | Lions | 376/247 |
| 3,724,268 | 4/1973 | Kuwabara | 376/247 |
| 3,890,588 | 6/1975 | Kanaya et al. | 374/185 |
| 3,913,058 | 10/1975 | Nishio et al. | 136/230 |
| 3,929,511 | 12/1975 | Solomon | 136/230 |
| 3,939,012 | 2/1976 | Williams | 136/221 |
| 4,018,624 | 4/1977 | Rizzolo | 136/230 |
| 4,262,532 | 4/1981 | Butler et al. | 374/185 |
| 4,265,117 | 5/1981 | Thoma et al. | 374/185 |
| 4,313,792 | 2/1982 | Smith | 376/247 |
| 4,436,438 | 3/1984 | Voznick | 374/185 |
| 4,492,948 | 1/1985 | Clayton et al. | 374/185 |

FOREIGN PATENT DOCUMENTS

| | | | |
|---|---|---|---|
| 596546 | 3/1978 | Switzerland | 374/185 |
| 849054 | 9/1960 | United Kingdom . | |

Primary Examiner—Salvatore Cangialosi
Attorney, Agent, or Firm—Dale Gaudier

[57] ABSTRACT

In order to reduce the measurement time of a device for measuring fluid temperature, in particular of water in the primary circuit of a nuclear power station, the device comprises a resistance probe (50) sensitive to the temperature of a stem (23) which is removably slid into a socket (1) itself secured in the pipe in which flows the fluid (10) whose temperature is to be measured. The stem ends with a surface in the form of a convex segment of a sphere (39) arranged to be urged by a resilient member onto a dish (42) force-fitted in the bottom of the socket.

2 Claims, 5 Drawing Figures

DEVICE FOR MEASURING TEMPERATURE

This invention relates to a device for measuring the temperature of a fluid, for example the fluid flowing in a pipe in a heat exchange circuit of a nuclear power station.

More particularly, the invention concerns a device intended to be installed in a fluid-tight socket, situated in the pipe, the device essentially comprising a stem arranged to be slid into the socket and applied, at its end, against the bottom of the socket, this stem carrying, adjacent the end, a temperature measuring element.

Such a device is described for example in U.S. Pat. No. 3,281,518. A similar device, although for a slightly different purpose, is described in U.S. Pat. No. 2,266,416.

The basic problem encountered in the construction of these devices is that of thermal inertia. In fact, although it is desirable to reduce the time necessary for a measurment, notably in the above-mentioned principal application of the invention, it is not possible on the other hand to avoid the existence of significant metal masses between the material whose temperature is to be measured and the temperature-measuring element, these masses being responsible for a delay in the measurement corresponding to the thermal conduction time which they introduce.

In particular, in the application foreseen as in U.S. Pat. No. 3,281,518, the wall of the socket introduces a delay in the measurement all the more significant since the socket, which must be able to resist very high pressures, is massive.

In the two above-referenced U.S. Patents, the problem is partly circumvented by making the measuring element in the form of a thermocouple. This arrangement permits one to avoid the need to provide, between the material whose temperature is to be measured and the measuring element, an insulator which also slows the attainment of thermal equilibrium.

However, the use of a themocouple has been found inappropriate in cases where a high measurement precision is required; in such a case, it is generally necessary to resort to a resistive element, the resistance of which varies as a function of temperature; this solution has on the other hand the disadvantage of requiring the use of an insulator for the resistance, which aggravates the problem of thermal conduction.

For example, U.S. Pat. No. 2,590,041 describes a device for measuring the temperature of a fluid, particularly a fluid flowing in a pipe, the device being intended to be installed in a fluid-tight socket, situated in the pipe and at the end of which there is provided a first contact surface, and the device comprising on the one hand a stem ending at a tip and arranged to be slid into said socket, and on the other hand resistive measuring means carried by the stem, the external surface of the said tip forming a second contact surface by means of which the tip, urged by the stem, fits against the said first contact surface, the said tip being made of a material having a high thermal conductivity, the said contact surfaces having, at least approximately, the form of complementary spherical segments disposed coaxially with the stem, and the said resistive means comprising an electric resistance varying as a function of temperature, constituted by an elongate resistive circuit in thermal contact with the tip but electrically insulated therefrom.

In this known device, the tip is in the form of a cylindrical cartridge, for example of silver, inserted into the end of the stem, and around which the insulated resistance is wound, within the stem.

Though such a device can give a more precise measurement than a thermocouple device, it cannot however enable a very rapid measurement in view of the conduction time of the tip along its longitudinal dimension.

In this context, the object of the present invention is to provide a device for temperature measurement having at the same time the precision inherent in the use of a measuring resistance and a very short response time such as can be obtained with a thermocouple.

In the device according to this invention the said tip has a plane internal surface, the said resistive means itself has a plane end surface in close contact with the internal surface of the tip, and the conformation of the resistive means and the tip is such that the said elongate resistive circuit forming the said resistance extends in the immediate vicinity of the external surface of the tip.

For example, the first contact surface is defined by a dish force-fitted in the bottom of the socket.

The manufacture of the socket is thereby facilitated, and the insertion process itself can include the step of finishing the contact surface of the dish.

In a first embodiment the resistive means comprises an insulating body surrounding the said electrical resistance, which is annular in form and disposed in a plane adjacent the said plane end surface of the resistive means. For example, the resistive means has a central hole in which a stud carried by the tip engages, deformation of this stud enabling the resistive means to be secured to the tip. Thus good contact is assured, in a simple manner, between the resistance and the sensing point of the device.

In another embodiment, the resistive means comprises an electric resistance formed as a thin film on an insulating suoport, and this resistive means is mounted, for example by adhesive, on the internal surface of the tip.

Preferably, the tip and the dish are made of materials having at least approximately the same coefficient of thermal expansion, in particular of gold alloys.

The contact between the dish and the tip of the device thus remains complete whatever the variation in temperature to which the device is exposed.

The invention also provides a sensor for measuring the temperature of a probe, wherein the probe is terminated at its sensitive end by a convex surface of revolution, centered on the longitudinal axis (X X') of the sensor, the electrical resistance being disposed in a plane within the probe, immediately adjacent the said surface of revolution.

A device according to this invention will now be described, by wav of example, with reference to the accompanying drawings, in which.

Figure 1:
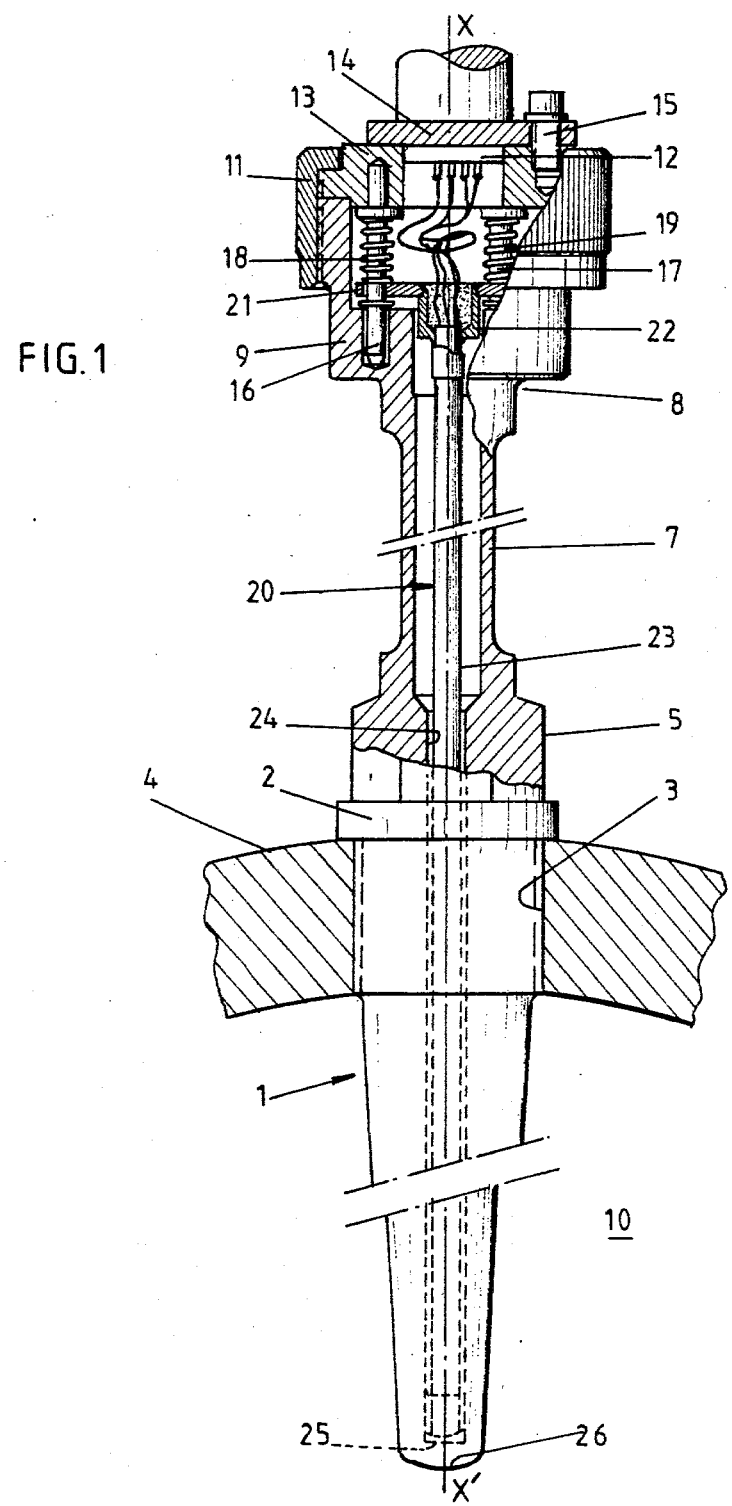
FIG. 1 is a partial cross-section of the device.

The device for measuring temperature includes (FIG. 1) a protective socket 1 of stainless steel, symmetrical about an axis XX', and screwed in a fluid-tight manner down to the face of a flange 2 on the socket, into a tapped hole 3 in the pipework 4 within which the fluid 10 whose temperature is to be measured circulates; the part of the socket which extends into the pipework is conical in form, tapering in towards the center thereof.

A part 5 of the body of the socket which protrudes from the pipework 3 couples to an axial, cylindrical extension tube 7, which is enlarged at its other end to form a base 8 of a cylindrical socket 9 open at the top (as seen in the figure); the cylindrical wall of the socket is externally threaded so as to receive an L-section ring 11, which secures in a fluid-tight manner, when it is screwed onto the socket 9, an annular cover 13 on the upper end of the socket 9. The center of the cover 13 carries the female part 12 of an electric connector, the male part 14 of which can be secured to the temperature measuring device by means of screws 15 extending into the cover 13; this cover has two fingers 16 and 17 which are symmetrically disposed about the axis XX' and the ends of which engage holes provided in the base 8 of the socket 9.

Springs 18 and 19 are threaded over the fingers 16 and 17 and compressed between the underside of the cover 13 and the top surface of a plate 21 threaded, by means of two symmetrical holes therein, over the fingers 16 and 17; an internal circular rim of the plate 21 is secured to the enlarged upper end 22 of a probe 20 having a cylindrical body 23 of metal alloy.

The body 23 extends downwards with side play in the extension tube 7 via a hole formed by the base 8 of the socket 9, and into a cylindrical axial hole 24 formed in the body of the socket 1, the hole 24 being closed by a plate 25, transverse to the axis XX' and a short distance from the rounded end 26 of the socket 1.

Figure 2:
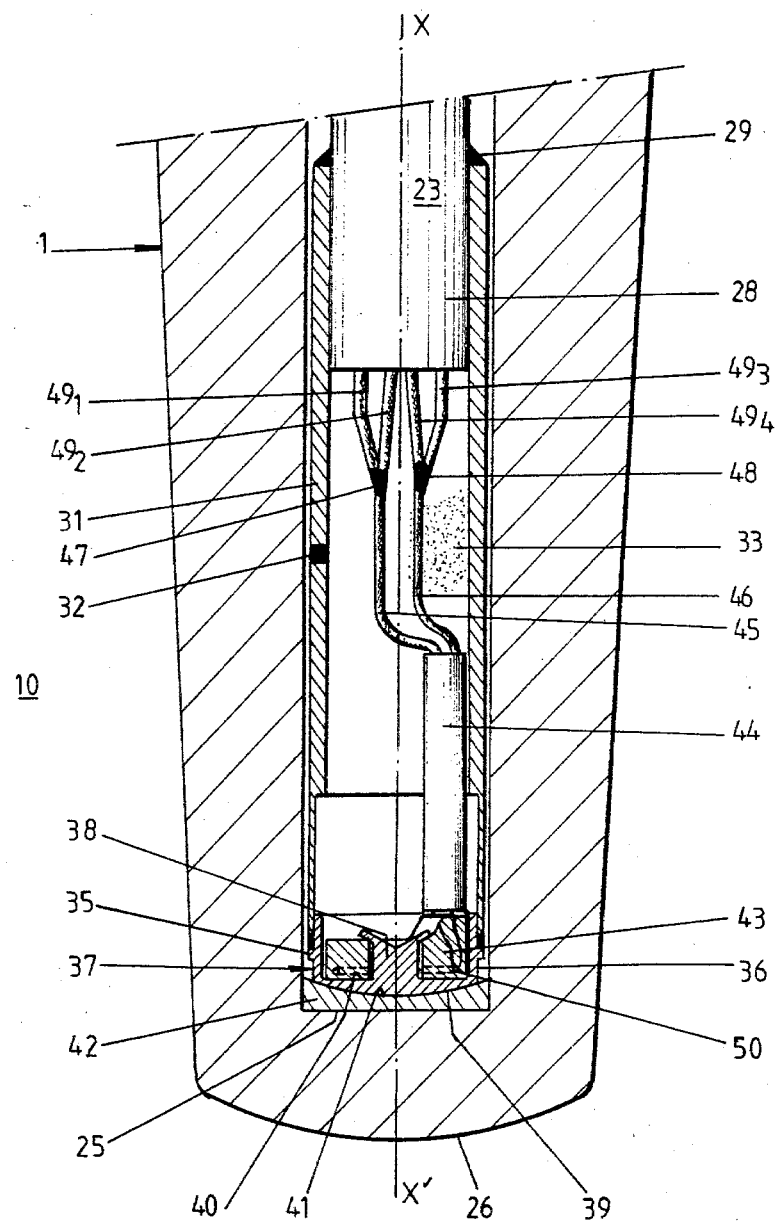
FIG. 2 is an enlarged sectional view of the sensing point of the device.

On the lower end 28 (FIG. 2) of the body 23 of the probe there is threaded, and then soldered at 29, an end tube 31 of metal alloy provided with a side hole 32 which is closed by solder in the final assembly of the probe; the lower end of the tube 31 has a reduced-thickness wall, in which a tip 37, having an external cylindrical wall 36, is screwed so that an external shoulder 35 of the tip abuts the end of the tube 31.

The tip 37, of gold or silver alloy, is symmetrical about the axis XX', and is soldered at 35 to the tube 31, and the part of it which closes the tube 31 has a plane upper surface 40 transverse to the axis XX', with a protrusion into the tube 31 formed by a central stud 38, and an external lower surface 39 having the form of a section of a sphere joining the external cylindrical surface of the wall 36.

This lower surface 39 rests on the upper spherical surface 41, having the same radius as the surface 39 and centered on the axis XX', of a dish 42, made of the same material as the tip 37, with a cylindrical body of the same diameter as the diameter of the hole 24, and the lower plane face of which presses on the surface 25.

A resistive element in the form of an annular ring 43 is located with side play by means of its central hole on the stud 38, and the stud 38 is deformed over the upper surface of this element, thereby securing the lower plane surface thereof in contact with the surface 40 of the tip 37.

Figure 3A:
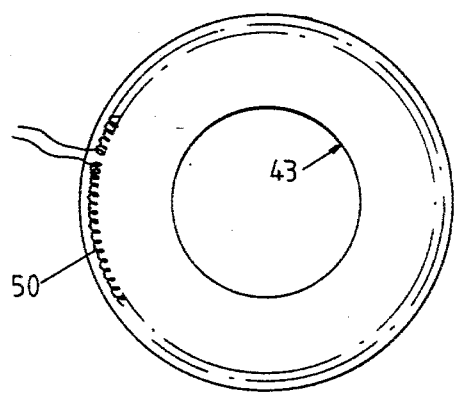
FIGS. 3A and 3B are plan views of electrical resistances used in the device.

The resistive element 43 is formed (FIG. 3A) by a helical coil 50 of platinum resistance wire disposed in a circle and embedded in a ceramic body, near to the lower plane annular surface thereof, the ends of the platinum resistance wire both extending outside the body and, at its upper part, first into two holes provided in an elongate insulating cylindrical sleeve 44, then as at 45 and 46 towards joints 47, 48 which connect the platinum resistance wire to four electric leads located in the tube 23 and extending up to the connector 12.

The assembly of the device described above is as follows:

When the socket 1 and its internal hole 24 have been made, the dish 42 is fitted into the bottom of the hole.

For the probe, the resistive element 43 is first fixed in the tip 37 by deforming the stud 38, and then the wires 45, 46 are threaded into the sleeve 44 and joined respectively to the copper connecting leads $49_1$, $49_2$ and $49_3$, $49_4$ which protrude from the lower end 28 of the tube 23, in which they are supported by a packing of insulating mineral.

The tube 31 is then threaded on to the upper part of the tube 23 and slid down it to its lower end, soldered as at 35 and 29 to the tip 37 and the tube 23, and then filled via the hole 32 with insulating powder 33 which electrically insulates the connecting wires from one another, and secures them in position within the probe despite any vibration to which it may be exposed, the filling hole then being closed off by soldering.

The plate 21 is then fixed to the upper part 22 of the tube 23, and the fingers 16, 17 are pushed into the holes provided in the plate 21 and the base 8 of the socket 9, with the springs 18, 19 in position, until the cover 13 contacts the socket as the locking ring 11 is screwed on. By virtue of the compressed springs between the cover and the plate, and the length of the probe being greater than that of the hole 24 together with the tube 7 and the hole provided in the base 8 of the socket 9, the spherical end section 39 of the tip 37 is maintained firmly but resiliently in contact with the surface 41 of the dish 42, whatever the vibration experienced by the probe, or the thermal expansions of the different components forming the device.

The operation of the device is as follows:

Once the socket 1 has been securely mounted in the pipe, which can in particular be the pipe in the primary circuit of a nuclear power station, or one on the cooling circuit of a conventional thermal power station, in which water is circulated at high pressure and temperature, the probe is inserted into the hole 24 and secured therein by the cover 13 and the ring 11. The resistance 50 is then energized at constant voltage by way of the connector 14 and the wires $49_1$ and $49_4$, 45 and 46, and a measurement is made via the connecting wires $49_2$, $49_3$ of the voltage which is developed at the terminals of the resistance 50.

Figure 4:
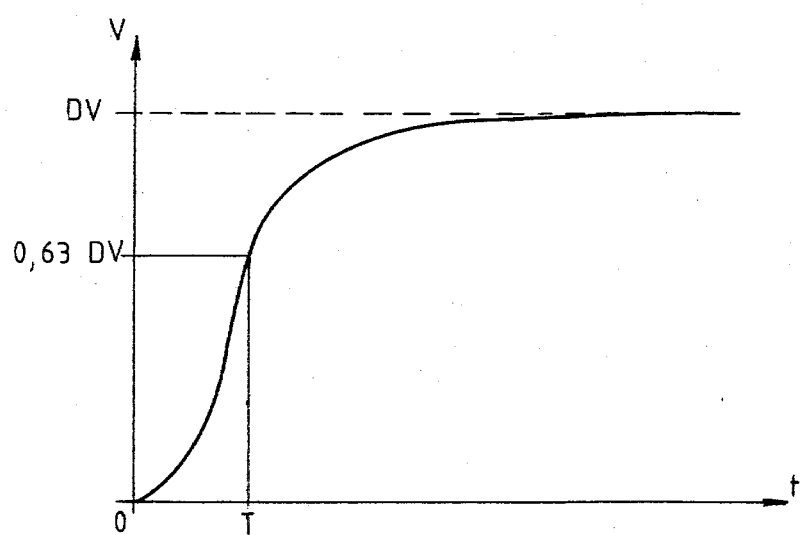
FIG. 4 is a schematic diagram.

In the event of a change of temperature level of the fluid 10 filling the pipe 3, the temperature of the resistance 50 alters rapidly since the thermal conduction from the fluid towards the resistance avoids any path through air or insulator, so that its value changes rapidly resulting in a change in the voltage V sensed at the end of the connecting wires $49_2$, $49_3$, as is shown in FIG. 4. It has been found that the time T necessary for the voltage change to reach 63.2% of the final voltage change DV was approximately 10 seconds, which corresponds to a gain in time of the order of 30 seconds in comparison with a conventional probe.

Figure 3B:
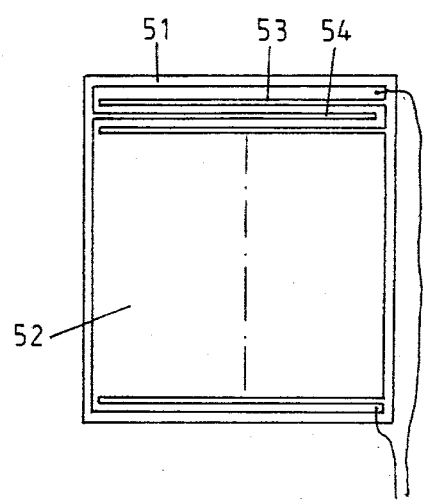

In another embodiment, the tip 37 has a plane upper internal surface 40, on which is glued a resistive element formed of a thin layer 51 (FIG. 3B) of electrically insulating material, notably a ceramic, on which is disposed a layer 52 of platinum, which forms the electical resistance, of generally rectangular shape, and notched as at 53, 54 so as to provide an elongated resistive electrical circuit.

In other applications, where the fluid pressure or its speed are not too high, it is possible to use the probe without having to provide the protective socket. The surface 39 of the tip of the probe is then preferably hemispherical in form.

I claim:

1. A resistive temperature sensor for use in a nuclear furnace, comprising:

a hollow socket having an internal bore terminating at a first tip, the first tip having an annular portion formed from a thermally conductive material and taking the form of a portion of a concave spherical surface of revolution arranged in a plane substantially perpendicular to and symmetrical about a longitudinal axis of the internal bore of the socket; and a resistive probe disposed within the internal bore of the socket and carrying at one end a temperature sensitive electrical resistance means disposed in contact with a ceramic body, the resistance means comprising an elongated portion of an electrically resistive material embedded in the thermally conducting second tip, a lower surface of the second tip having a convex shape disposed in substantially full contact with the concave portion of the first tip.

2. A resistive temperature sensor for use in a nuclear furnace, comprising:

a hollow socket having an internal bore terminating at a first gold or gold alloy tip, the first tip having an annular portion taking the form of a portion of a concave spherical surface of revolution arranged in a plane substantially perpendicular to symmetrical about the longitudinal axis of the internal bore of the socket; and a resistive probe disposed within the internal bore of the socket and carrying at one end temperature sensitive electrical resistance means comprising a serpentine resistance formed on a planar substrate of ceramic material substantially parallel to the plane including the annular portion of said first tip, said ceramic material located on an upper surface of a gold or gold alloy second tip, a lower surface of said second tip having a convex shape disposed in substantially full contact with the concave portion of the first tip.

* * * * *